(12) United States Patent
Evulet et al.

(10) Patent No.: US 12,434,833 B2
(45) Date of Patent: Oct. 7, 2025

(54) ADAPTIVE VERTICAL TAKE-OFF AND LANDING PROPULSION SYSTEM

(71) Applicant: JETOPTERA, INC., Edmonds, WA (US)

(72) Inventors: Andrei Evulet, Edmonds, WA (US); Tyler Smallwood, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 0 days.

(21) Appl. No.: 18/221,034

(22) Filed: Jul. 12, 2023

(65) Prior Publication Data

US 2024/0199205 A1    Jun. 20, 2024

Related U.S. Application Data

(63) Continuation of application No. 16/681,555, filed on Nov. 12, 2019, now abandoned, which is a continuation-in-part of application No. PCT/US2019/032988, filed on May 17, 2019, and a continuation-in-part of application No. 16/020,116, filed on Jun. 27, 2018, now Pat. No. 11,148,801, and a continuation-in-part of application No. 16/020,802, filed on Jun. 27, 2018, now Pat. No. 11,001,378, and a continuation-in-part of application No. 15/685,975, filed on Aug. 24, 2017, now Pat. No. 11,396,896, and a continuation-in-part of application No. 15/686,052, filed on Aug. 24, 2017, now Pat. No. 10,641,204, and
(Continued)

(51) Int. Cl.
*B64C 29/00* (2006.01)
*B64C 39/06* (2006.01)
*B64D 27/20* (2006.01)

(52) U.S. Cl.
CPC .......... *B64C 29/0066* (2013.01); *B64D 27/20* (2013.01); *B64C 39/066* (2013.01)

(58) Field of Classification Search
CPC . B64C 29/0075; B64C 15/14; B64C 29/0066; B64D 27/14; B64D 27/20
See application file for complete search history.

(56) References Cited

U.S. PATENT DOCUMENTS 3,051,413 A * 8/1962 Pouit ..................... B64C 23/005
                                                        244/12.5
3,278,141 A * 10/1966 Wolcott ................... B64D 1/16
                                                        244/136
(Continued)

*Primary Examiner* — William L Gmoser
(74) *Attorney, Agent, or Firm* — Pg Scott Born; FISHERBROYLES, LLP

(57) ABSTRACT

A propulsion system for an aircraft includes a plenum having an intake port and an output port. A fan is coupled to a motor configured to power the fan, and the powered fan is configured to compress ambient air entering the intake port. One or more ejectors are fluidically coupled to the plenum via one or more valves. A nozzle is disposed within the output port and includes a set of vanes. The system operates in a first configuration in which the nozzle vanes are closed and the compressed ambient air exits the plenum only through the one or more valves into the one or more ejectors. The system operates in a second configuration in which the one or more valves are closed, the nozzle vanes are open and the compressed ambient air exits the plenum only through the output port.

2 Claims, 9 Drawing Sheets

Related U.S. Application Data a continuation-in-part of application No. 15/670,943, filed on Aug. 7, 2017, now abandoned, and a continuation-in-part of application No. 15/654,621, filed on Jul. 19, 2017, now abandoned, and a continuation-in-part of application No. 15/368,428, filed on Dec. 2, 2016, now abandoned, and a continuation-in-part of application No. PCT/US2016/064827, filed on Dec. 2, 2016, and a continuation-in-part of application No. 15/456,450, filed on Mar. 10, 2017, now Pat. No. 10,464,668, and a continuation-in-part of application No. 15/256,178, filed on Sep. 2, 2016, now Pat. No. 10,207,812, and a continuation-in-part of application No. PCT/US2017/021975, filed on Mar. 10, 2017, and a continuation-in-part of application No. 15/221,389, filed on Jul. 27, 2016, now Pat. No. 10,501,197, and a continuation-in-part of application No. PCT/US2016/044327, filed on Jul. 27, 2016, and a continuation-in-part of application No. 15/625,907, filed on Jun. 16, 2017, now abandoned, said application No. 16/681,555 is a continuation-in-part of application No. 15/221,439, filed on Jul. 27, 2016, now Pat. No. 10,800,538, and a continuation-in-part of application No. PCT/US2016/050236, filed on Sep. 2, 2016, and a continuation-in-part of application No. PCT/US2016/044326, filed on Jul. 27, 2016.

(60) Provisional application No. 62/758,441, filed on Nov. 9, 2018, provisional application No. 62/817,448, filed on Mar. 12, 2019, provisional application No. 62/839,541, filed on Apr. 26, 2019, provisional application No. 62/673,094, filed on May 17, 2018, provisional application No. 62/525,592, filed on Jun. 27, 2017, provisional application No. 62/380,108, filed on Aug. 26, 2016, provisional application No. 62/379,711, filed on Aug. 25, 2016, provisional application No. 62/371,612, filed on Aug. 5, 2016, provisional application No. 62/371,926, filed on Aug. 8, 2016, provisional application No. 62/531,817, filed on Jul. 12, 2017, provisional application No. 62/263,407, filed on Dec. 4, 2015, provisional application No. 62/307,318, filed on Mar. 11, 2016, provisional application No. 62/213,465, filed on Sep. 2, 2015.

(56) References Cited

U.S. PATENT DOCUMENTS

| | | | | |
|---|---|---|---|---|
| 3,576,300 | A * | 4/1971 | Palfreyman | B64D 27/20 244/1 N |
| 3,936,017 | A * | 2/1976 | Blythe | B64D 33/06 181/259 |
| 3,940,092 | A * | 2/1976 | Farris | B64C 15/02 239/265.33 |
| 3,960,345 | A * | 6/1976 | Lippert, Jr. | B64C 23/06 244/54 |
| 4,222,234 | A * | 9/1980 | Adamson | F02K 3/065 244/54 |
| 4,301,980 | A * | 11/1981 | Bradfield | B64C 29/0066 244/55 |
| 4,343,446 | A * | 8/1982 | Langley | B64C 29/0066 D12/335 |
| 4,969,614 | A * | 11/1990 | Capuani | B64C 39/10 244/12.3 |
| 5,666,803 | A * | 9/1997 | Windisch | B64C 29/0066 60/232 |
| 6,318,668 | B1 * | 11/2001 | Ulanoski | B64C 29/0058 239/265.19 |
| 7,823,826 | B1 * | 11/2010 | Lewis | B64C 29/005 244/12.5 |
| 7,823,838 | B1 * | 11/2010 | De ning | B64C 15/02 244/55 |
| 7,878,458 | B2 * | 2/2011 | Shmilovich | B64C 9/38 244/12.5 |
| 7,967,219 | B1 * | 6/2011 | Taylor | B64C 29/0066 239/265.19 |
| 7,988,087 | B1 * | 8/2011 | Tonks | F02K 1/008 244/12.5 |
| 8,690,098 | B2 * | 4/2014 | Todorovic | B64D 29/04 165/44 |
| 9,108,725 | B1 * | 8/2015 | Shmilovich | B64C 21/08 |
| 9,587,585 | B1 * | 3/2017 | Rolling | B64C 39/08 |
| 10,933,991 | B2 * | 3/2021 | Cottrell | B64C 27/20 |
| 2008/0315042 | A1 * | 12/2008 | Evulet | F02K 7/08 244/53 B |
| 2011/0215204 | A1 * | 9/2011 | Evulet | B64D 33/04 60/264 |
| 2011/0240804 | A1 * | 10/2011 | Kehayas | B64D 33/04 244/73 R |

* cited by examiner

ADAPTIVE VERTICAL TAKE-OFF AND LANDING PROPULSION SYSTEM

PRIORITY CLAIM

This Application is a continuation of U.S. patent application Ser. No. 16/681,555 filed Nov. 12, 2019, which application claims priority to U.S. Provisional Application Ser. No. 62/758,441, filed Nov. 9, 2018, U.S. Provisional Application Ser. No. 62/817,448, filed Mar. 12, 2019 and U.S. Provisional Application Ser. No. 62/839,541, filed Apr. 26, 2019, the entire disclosures of which are hereby incorporated by reference as if fully set forth herein.

This Application is a continuation-in-part of Application Serial No. PCT/US2019/032988 filed May 17, 2019, which claims the benefit of U.S. Provisional Application Ser. No. 62/673,094 filed May 17, 2018.

This Application is a continuation-in-part of Application Serial No. PCT/US2019/034409 filed May 29, 2019, which claims the benefit of U.S. Provisional Application Ser. No. 62/677,419 filed May 29, 2018.

This Application is a continuation-in-part of application Ser. No. 16/020,116 filed Jun. 27, 2018, and application Ser. No. 16/020,802 filed Jun. 27, 2018, both of which claim the benefit of U.S. Provisional Application Ser. No. 62/525,592 filed Jun. 27, 2017.

This Application is a continuation-in-part of application Ser. No. 15/685,975 filed Aug. 24, 2017, and application Ser. No. 15/686,052 filed Aug. 24, 2017, both of which claim the benefit of U.S. Provisional Application Ser. No. 62/380,108 filed Aug. 26, 2016 and 62/379,711 filed Aug. 25, 2016.

This Application is a continuation-in-part of application Ser. No. 15/670,943 filed Aug. 7, 2017, which claims the benefit of U.S. Provisional Application Ser. No. 62/371,612 filed Aug. 5, 2016; 62/371,926 filed Aug. 8, 2016; 62/379,711 filed Aug. 25, 2016; 62/380,108 filed Aug. 26, 2016; 62/525,592 filed Jun. 27, 2017; and 62/531,817 filed Jul. 12, 2017.

This Application is a continuation-in-part of application Ser. No. 15/654,621 filed Jul. 19, 2017, which claims the benefit of U.S. Provisional Application Ser. No. 62/371,612 filed Aug. 5, 2016; 62/371,926 filed Aug. 8, 2016; 62/379,711 filed Aug. 25, 2016; 62/380,108 filed Aug. 26, 2016; 62/525,592 filed Jun. 27, 2017; and 62/531,817 filed Jul. 12, 2017.

This Application is a continuation-in-part of application Ser. No. 15/368,428 filed Dec. 2, 2016; which claims the benefit of Application Ser. No. 62/263,407 filed Dec. 4, 2015.

This Application is a continuation-in-part of Application Serial No. PCT/US2016/064827 filed Dec. 2, 2016; which claims the benefit of Application Ser. No. 62/263,407 filed Dec. 4, 2015.

This Application is a continuation-in-part of application Ser. No. 15/456,450 filed Mar. 10, 2017; which claims the benefit of Application Ser. No. 62/307,318 filed Mar. 11, 2016; and is a continuation-in-part of application Ser. No. 15/256,178 filed Sep. 2, 2016; which claims the benefit of Application Ser. No. 62/213,465 filed Sep. 2, 2015.

This Application is a continuation-in-part of Application Serial No. PCT/US2017/021975 filed Mar. 10, 2017; which claims the benefit of 62/307,318 filed Mar. 11, 2016.

This Application is a continuation-in-part of application Ser. No. 15/221,389 filed Jul. 27, 2016; which claims the benefit of Application Ser. No. 62/213,465 filed Sep. 2, 2015.

This Application is a continuation-in-part of Application Serial No. PCT/US2016/044327 filed Jul. 27, 2016; which claims the benefit of Application Ser. No. 62/213,465 filed Sep. 2, 2015.

This Application is a continuation-in-part of application Ser. No. 15/625,907 filed Jun. 16, 2017; which is a continuation-in-part of application Ser. No. 15/221,389 filed Jul. 27, 2016; which claims the benefit of 62/213,465 filed Sep. 2, 2015.

This Application is a continuation-in-part of application Ser. No. 15/221,439 filed Jul. 27, 2016; which claims the benefit of Application Ser. No. 62/213,465 filed Sep. 2, 2015.

This Application is a continuation-in-part of Application Serial No. PCT/US16/44326 filed Jul. 27, 2016; which claims the benefit of Application Ser. No. 62/213,465 filed Sep. 2, 2015.

This Application is a continuation-in-part of application Ser. No. 15/256,178 filed Sep. 2, 2016; which claims the benefit of Application Ser. No. 62/213,465 filed Sep. 2, 2015.

This Application is a continuation-in-part of Application Serial No. PCT/US2016/050236 filed Sep. 2, 2016; which claims the benefit of Application Ser. No. 62/213,465 filed Sep. 2, 2015.

All of the aforementioned applications are hereby incorporated by reference as if fully set forth herein.

COPYRIGHT NOTICE

This disclosure is protected under United States and International Copyright Laws. © 2023 Jetoptera, Inc. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

One of the main challenges of designing a Vertical Take-off and Landing (VTOL) aircraft is sizing the propulsion system to be efficient in both VTOL and hover phases as well as cruise conditions. Since the propulsion system fraction of the total weight needs to be kept low to maximize payload and fuel reserves, the challenge is how to employ a system that produces roughly 4-6 times more thrust at take-off (in lift-by-thrust-only mode) or in hover, compared to in wing-borne and cruise conditions. In the first case the thrust is balancing the weight of the aircraft and much larger engines and power or thrust are required, whereas in cruise conditions the size of the engine needs to be much smaller to balance drag as the wings of the aircraft balance the weight.

Traditionally VTOL was achieved with either separate systems (lift/cruise compromising weight but separating propulsion) or pure rotorcraft such as helicopters (compromising wing-borne capabilities). The most successful aircraft employing VTOL capabilities use the same system for both vertical and wing-borne phases. Examples are jump-jets such as Harrier Hawker, which vectors its turbofan jets (but ends up oversizing the engine for the missions in wing-borne phase) and the V22 Osprey, which utilizes turboprops with tilting capabilities. The tilt-rotor approach is not without risks including vibrations, vortex ring state (VRS) and large footprints, as well as complex architectures.

For smaller systems (i.e., 2-4 passenger aircraft) especially in the growing Urban Air Mobility market, large lift+cruise airplanes are the dominant design. Especially for electric VTOL, this results in very large footprint and moving parts between 8-16 large rotors for efficiency reasons. The wingspan for carrying 4-6 passengers may be as large as the wingspan of a small regional plane. The weight of the aircraft due to today's low energy density batteries also impose large-size wings and complex operation with the multi-rotors, increasing risk.

BRIEF DESCRIPTION OF THE DRAWING FIGURES

Preferred and alternative embodiments of the present invention are described in detail below with reference to the following drawings.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

A fluidic propulsion system (FPS) according to an embodiment introduces an alternate approach where thrusters without rotating parts can be tilted for transitioning from hovering to cruise. During VTOL and hover, thrust augmentation can be obtained using a pressurized fluid as source. One or more embodiments may include a system that is used in all phases of flight (vertical and wing-borne) while still obtaining an augmentation for thrust in a forward moving direction.

An embodiment includes a lift+cruise solution involving a source of compression such as a fan or compressor of fluids including air, as well as a dual capability to switch from an augmented thrust in vertical flight (VTOL+hover) and a separate turbofan configuration in cruise. Such a configuration and operation would eliminate the restriction in speed and allow a VTOL vehicle to move forward at very high velocity, higher altitude capabilities and operate very efficient by lowering significantly the fuel burn (specific fuel consumption.)

More descriptively, a fan or compressor or similar machine receives mechanical work and compresses ambient air to a pressure ratio of between 1.5-2.5. The component may have one or several stages and may be driven preferably by a gas turbine stage such as the free turbine of a turboshaft engine, without the need of a reduction gear. This element is optionally advantageous as the weight and moving parts reduction will allow a lighter and simpler construction to be employed.

Figure 1:
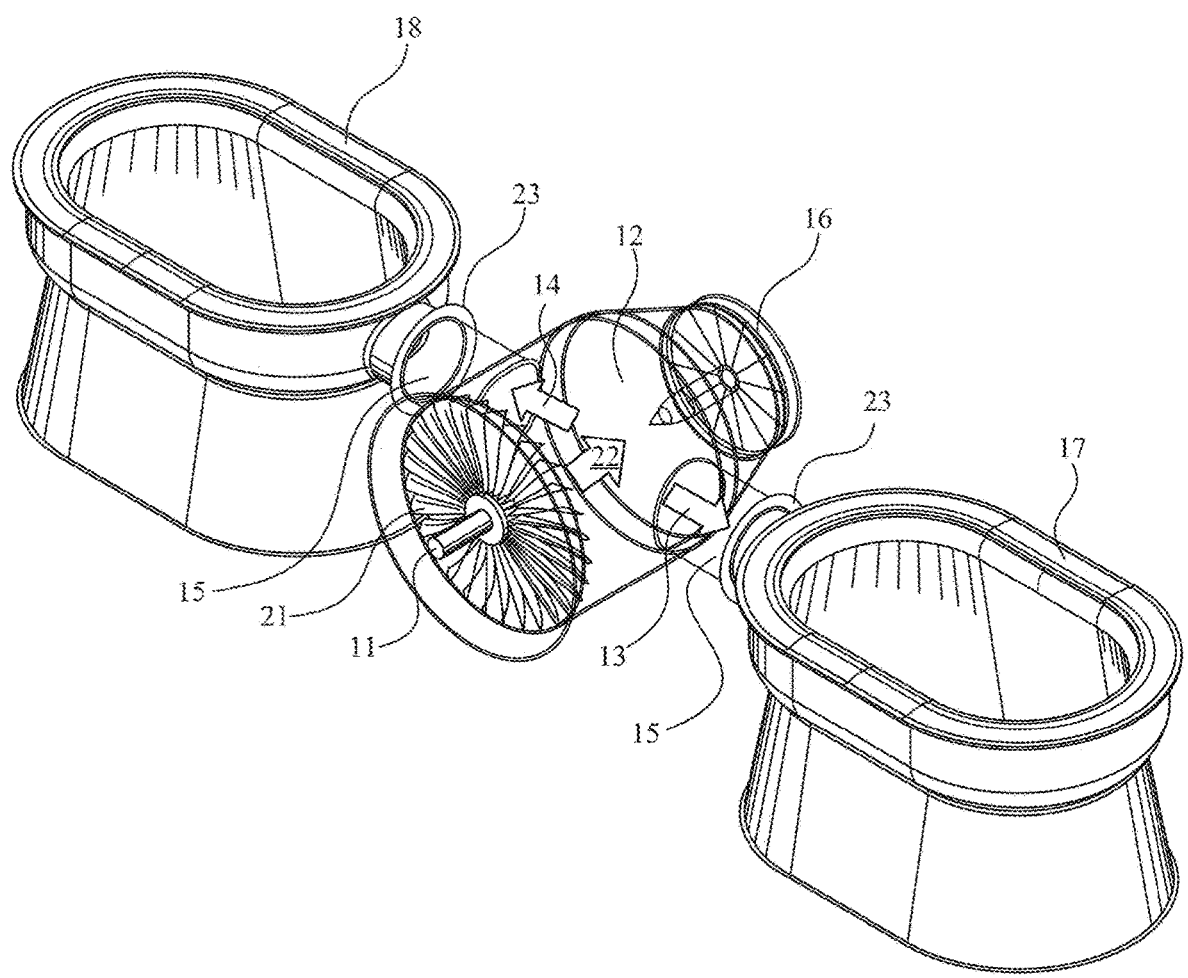
FIG. 1 shows a perspective view of an embodiment in trimetric view in VTOL configuration.
Figure 3:
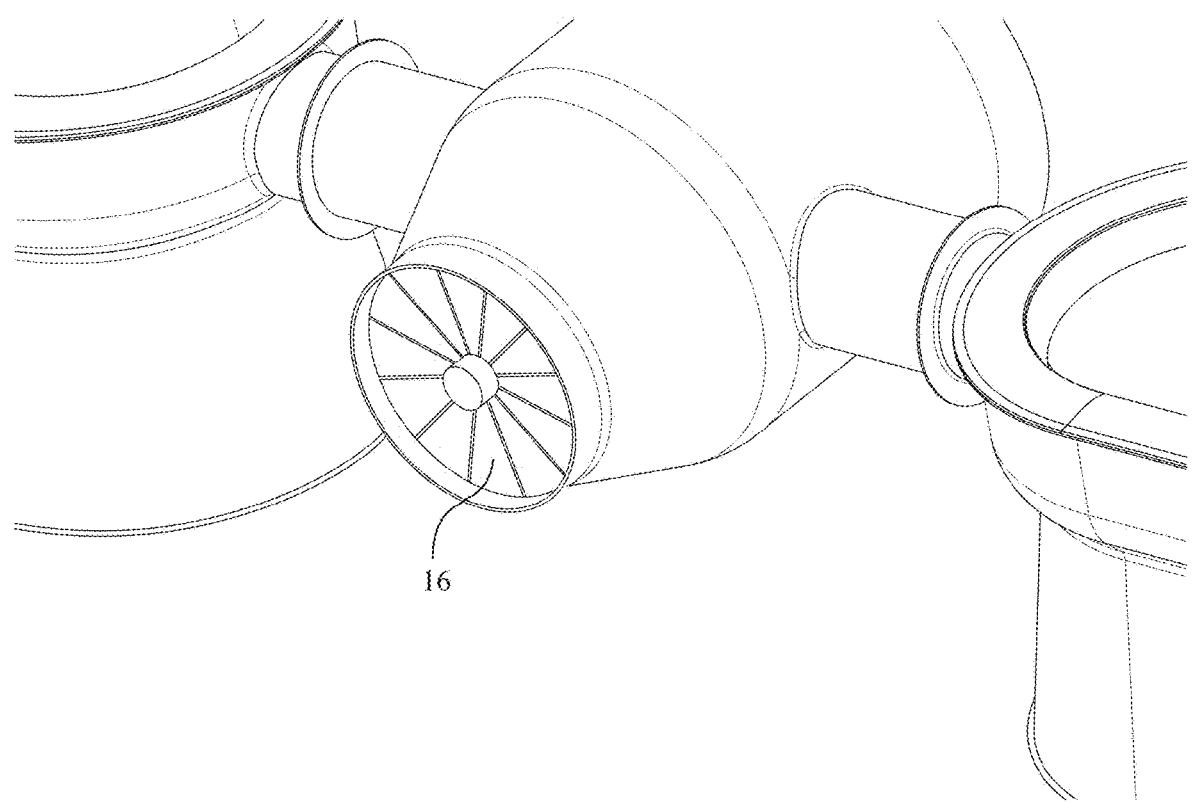
FIG. 3 shows a perspective view of variable vanes in VTOL configuration according to an embodiment.

Referring to FIG. 1, a shaft 11 receives the mechanical power from the free turbine of a turboshaft or electric motor, and transmits the power to a fan 21 to compress the air to the aforementioned pressure ratios. The air is pumped into a plenum 12 immediately downstream of the fan 21, and from there the air may be directed into side ports 13 and 14 or axially downstream through a nozzle having variable vanes 16. Vanes 16 can be fully closed or fully opened via mechanisms known in the art. For example, one such mechanism could be the variable guide vanes employed in a typical compressor. Another mechanism could be a mechanical screw rotating the hub of the vanes 16 and forcing the vanes to close. When closed as seen in FIGS. 1 and 3, the entire flow from the fan 21 is forced into the side ports 13 and 14 of the plenum 12 and into FPS system elements 17, 18 connected fluidically to the plenum 12 via valves 15.

In one embodiment the fan 21 receives a power of, for example, 1000 kW from a free turbine of a gas turbine of the turboshaft type that spins at, for example, 25,000 RPM. This value is typical of a machine such as a typical turboprop architecture, before the reduction gear, at full speed. Such power and speed can yield a compressed air stream of, e.g., 1.8 atmospheres (a pressure ratio of 1.8 or 180 kPa approximately) and a flow of circa 15 kg/s assuming an efficiency of 80% on the part of the fan.

The fan 21 itself may be manufactured of ultralight materials such as titanium or even composite materials, the former using wide chord, compound swept fan blades for higher efficiency and manufactured in one piece as a blisk. A design with low noise features is included.

At 15 kg/sec, 180-200 kPa total pressure, and assuming an air temperature of 353 Kelvin, stream 22 is split and transmitted to FPS elements 17, 18 embedded within an airframe of an aircraft. The FPS elements 17, 18, which are described in greater detail as ejectors in, for example, U.S. patent application Ser. No. 15/221,389 filed Jul. 27, 2016 and Ser. No. 15/256,178 filed Sep. 2, 2016, which are hereby incorporated by reference as if fully set forth herein, can augment the thrust which would otherwise result from accelerating and expanding the flow simply to the atmospheric pressure to at least 2:1 and up to 3:1 ratios. In this example, the thrust achieved via ejector augmentation is given in Equation 1 below:

$$2*15 \text{ kg/s} * \sqrt{1.4*287\frac{J}{\text{kgK}}*353\text{K}} = 11.3 \text{ kN thrust} \quad \text{Eq. 1}$$

as opposed to a thrust of 5.65 kN if a simple nozzle is employed. In this case 287 J/kg-K is the air constant, 1.4 is the air exponential factor, 353 K is the discharge temperature from the fan 21 compression, 2 is the augmentation ratio and 15 kg/s is the total mass flow rate.

With further optimization of the FPS elements 17, 18, the total thrust may reach an augmentation ratio of 2.5, meaning 14.122 kN, for the same amount of mechanical input power of 1000 kW supplied to the fan 21.

Figure 9:
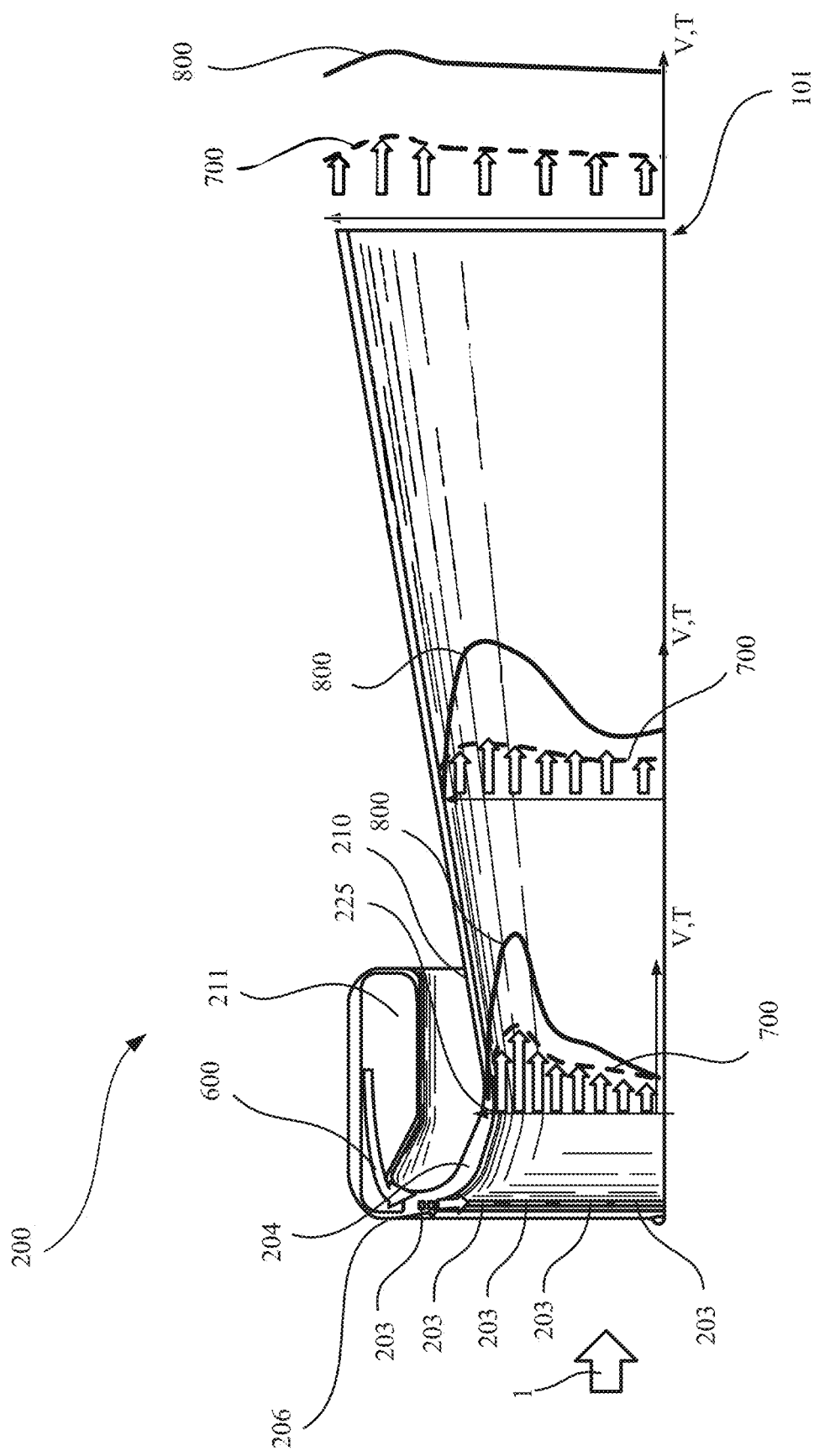
FIG. 9 is a cross-section of an ejector of an embodiment of the present invention depicting the upper half of the ejector and profiles of velocity and temperature within the internal flow.

FIG. 9 illustrates a cross-section of the upper half of an ejector 200, the structure and functionality of which is similar or identical to that of elements 17, 18. A plenum 211 is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 100 of diffuser 210. As the mixture of the stream 600 and the air 1 approaches the exit plane of terminal end 100, the temperature and velocity profiles are almost uniform. In particular, the temperature of the mixture is low enough to be directed towards an airfoil such as a wing or control surface.

Figure 5:
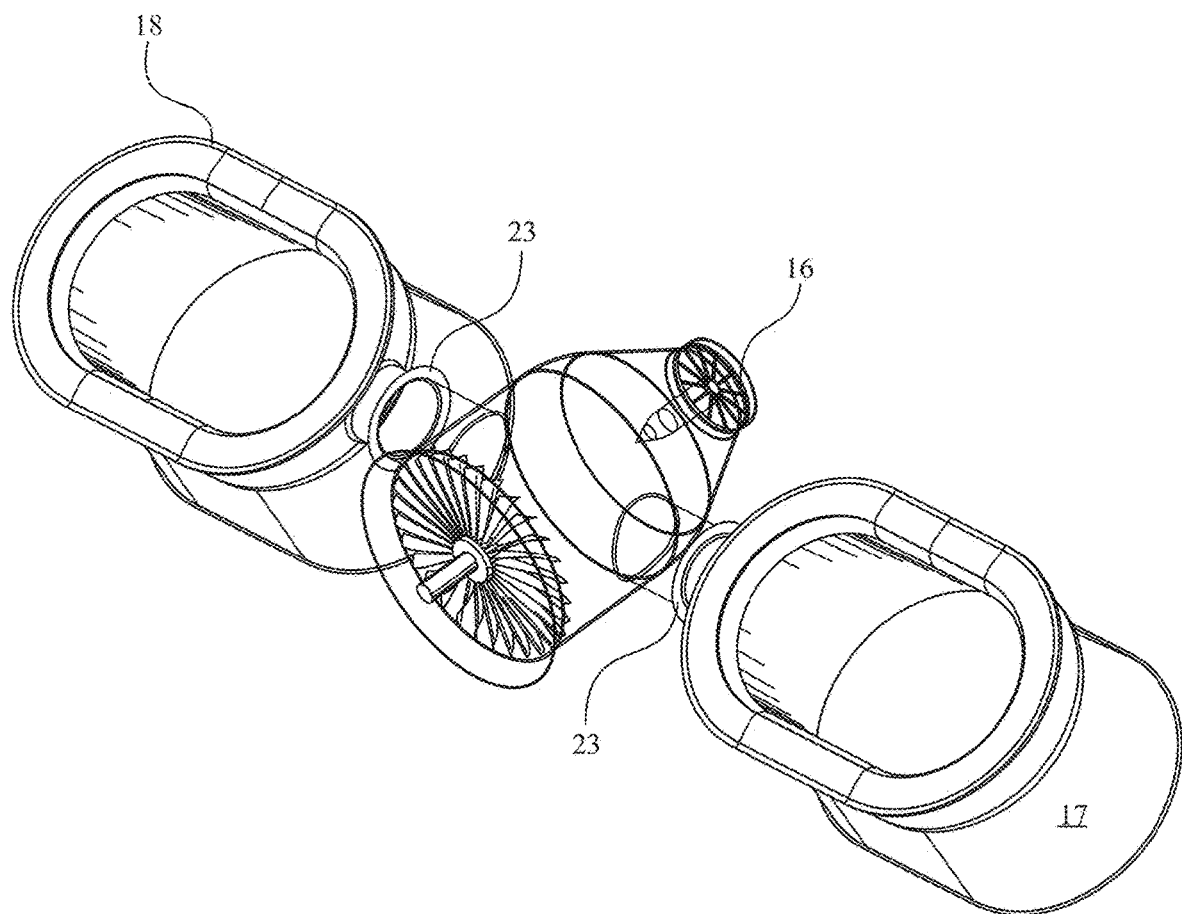
FIG. 5 shows a perspective view of the mid-transition from VTOL to wingborne configuration and 45-degree FPS system elements while the aircraft accelerates only due to FPS system elements according to an embodiment.

When vanes 16 are closed and the fan 21 supplies this power, enough thrust may be obtained from such a system to enable lifting of an aircraft that weighs, for example, between 1100 and 1400 kgs. This type of aircraft may direct the thrust upwards via swiveling FPS elements 17, 18 supplied from the fan 21 via ports 13 and 14, which can also rotate with respect to their principal axes via swiveling joints 23. The swiveling or vectoring of FPS elements 17, 18 can change the attitude of the aircraft first in vertical takeoff, further in hovering via small angle changes and finally in transition to wing borne operation via swiveling of the FPS elements to direct the thrust at 45 degrees (as shown in FIG. 5) up to 90 degrees perpendicular to the original VTOL position shown in FIG. 1.

Figure 2:
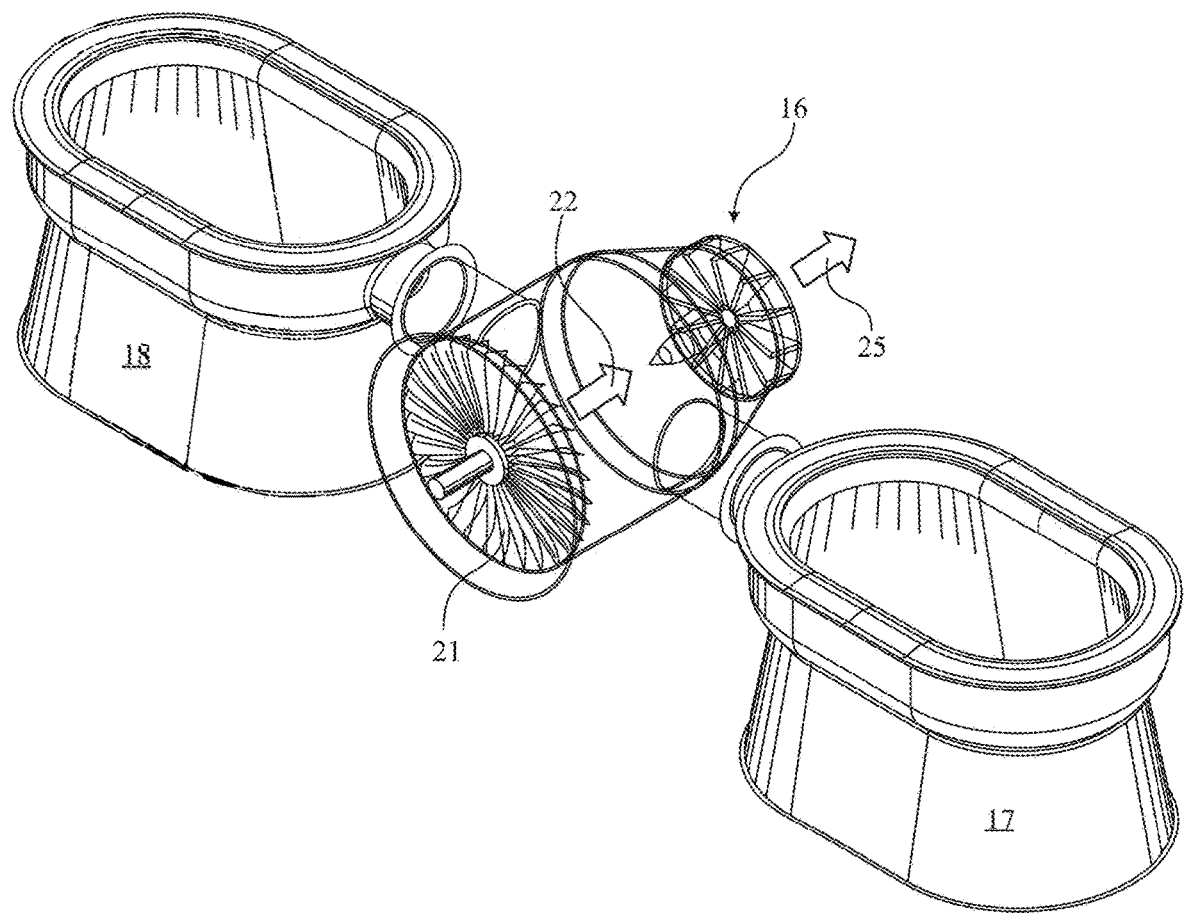
FIG. 2 shows a perspective trimetric view of a cruise configuration with FPS system elements used as air brakes for transition to VTOL according to an embodiment.
Figure 4:
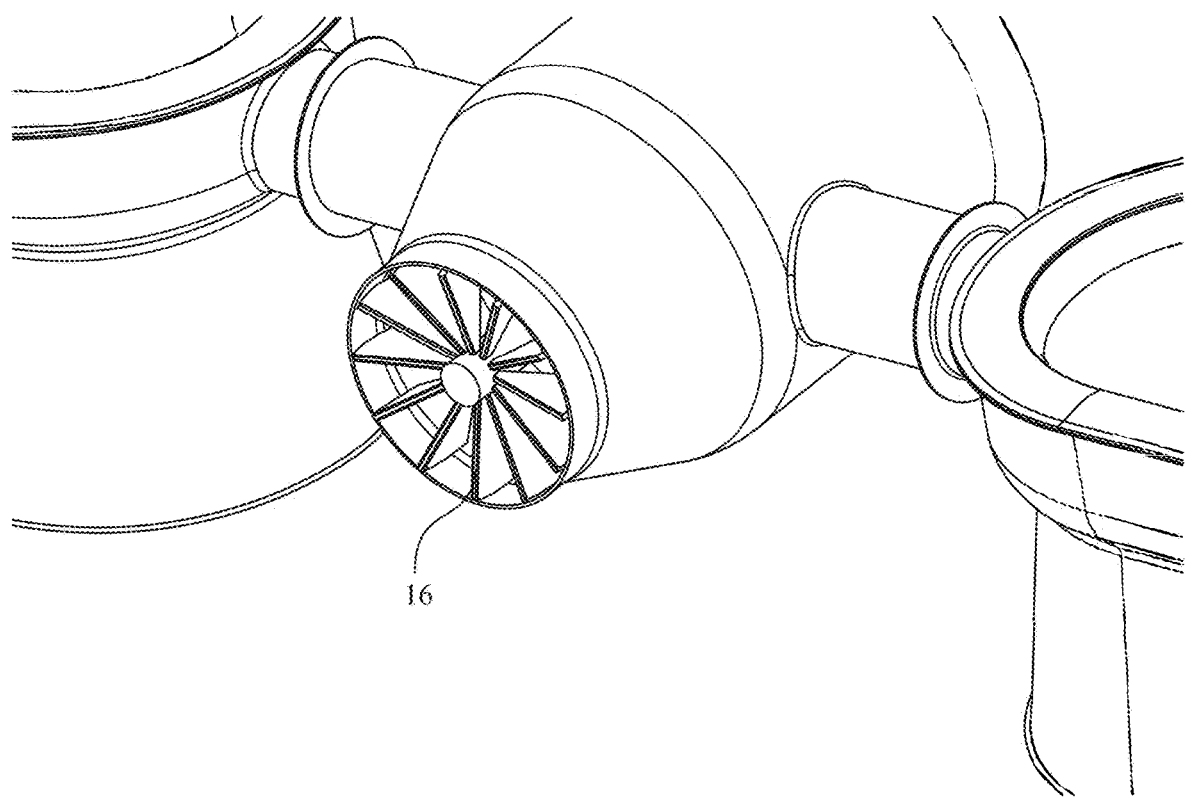
FIG. 4 shows a perspective view of variable vanes in full cruise configuration with FPS system elements extended for airbraking according to an embodiment.

The angles in the swiveling joints 23, which also allow the passage of the flow to the elements 17, 18, can be gradually changed to allow a perfect balancing of the aircraft from hover to gaining speed and increase the lift of the wings of the aircraft at forward velocities of, e.g., 10% more than stall velocities of the aircraft. For example, an aircraft according to an embodiment of a VTOL aircraft may reach a speed of 50 mph within a few tens of seconds after hovering at a fixed point, while still balancing some of the weight via FPS 17, 18 pointing at 45 degrees upwards in the direction of flight, and still accelerating in the forward direction while the wings begin supporting, e.g., 50% of the weight of the aircraft flying forward. At this point in time and while the aircraft is rapidly still accelerating to 100 mph, FPS elements 17, 18 are moving into perfectly horizontal position (90 degrees or more perpendicular to their original VTOL position) and a balance between the drag force and thrust is achieved using purely the FPS system (i.e., all air 22 is routed via ports 13 and 14 to supply the FPS elements with motive fluid). Close to a forward air speed of, for example, 150 mph, the vanes 16 begin to open and allow the air stream 22 to pass through the vanes thus pushing the aircraft forward in a faster manner. During said transition to fully wing-borne operation, the augmentation ratio of the FPS is lowered due to the increasing ram drag imposed by the incoming air into the FPS elements 17, 18. The final thrust obtained in wing borne operation can be increased by switching to fully open vanes 16 as shown in FIGS. 2 and 4 and closing valves 15 thereby blocking the air supply to the ports 13 and 14 and forcing the entirety of air 22 to exit the plenum 12 via vanes 16 resulting in an accelerated stream 25 and propelling the aircraft in the forward direction and wing-borne mode at speeds that can be modulated by the RPM of fan 21.

Figure 6:
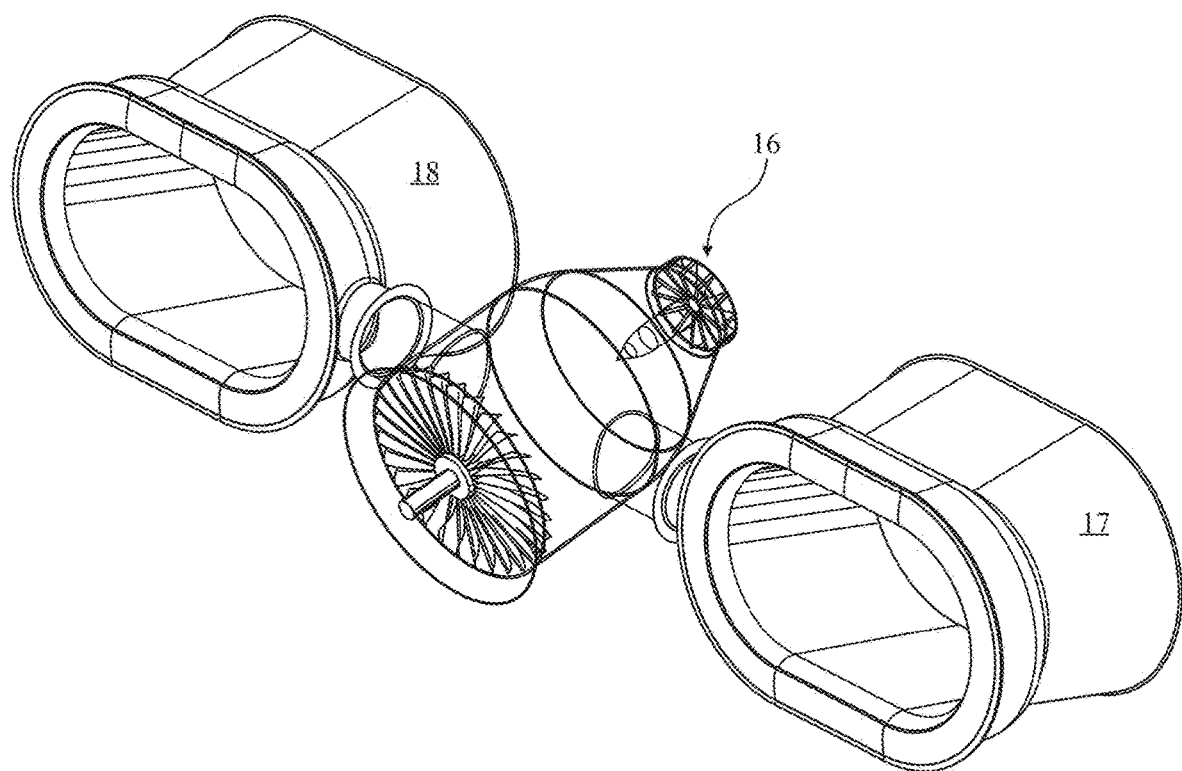
FIG. 6 shows a perspective view of the system elements in cruise configuration according to an embodiment.

In this manner, an embodiment solves the problem of mismatches between separate takeoff and cruise powerplants by using the same powerplant to supply the mechanical work via shaft 11 to the fan 21. In addition, reduction of fuel flow to the main gas turbine providing mechanical power results in slowing down the fan 21 similar to a turbofan operation. By shutting off the air to the FPS elements 17, 18 at the end of the transition and during fully wing-borne high-speed flight, the fan speed reduction via mechanical work reduction will result in fuel savings and will allow a much wider flight envelope in altitude, speed, and maneuverability, since the aircraft will require significantly lower thrust for forward moving. For instance, 30% of the thrust needed for VTOL using the FPS elements 17, 18 can now be supplied by using the nozzle vanes 16 for high speed cruising whilst operating the fan 21 at lower than maximum speed. This means adjusting to a thrust calculated with an augmentation ratio of 1.0 per Equation 2:

$$15 \text{ kg/s} * \sqrt{1.4 * 287 \frac{J}{\text{kgK}} * 353\text{K}} = 5.65 \text{ kN} \qquad \text{Eq. 2}$$

when the aircraft is in full wing-borne mode. A typical general aviation aircraft achieving such thrust would have no problem accelerating to speeds exceeding 400 mph and high altitudes. Conversely, a transition can be achieved for transferring from cruise, as illustrated in FIG. 6, to hovering via closure of vanes 16 and forcing the air through ports 13 and 14 to open the FPS operation and reverse the swiveling movement of FPS elements 17, 18 from nearly horizontal and embedded into the fuselage of the aircraft to nearly vertical position for hovering or landing. With the rotation of FPS elements 17, 18, they can also be used as air brakes slowing down the aircraft to a point where gradually the wings provide less lift and the elements 17, 18 provide most of the balance to the weight of the aircraft. At the point where the aircraft has slowed down sufficiently and is nearly stationary in the hovering mode, the modulation of the fan 21 (now operating with vane system 16 fully closed and ports 13 and 14 fully opened) allows for the thrust to decrease to a point where the aircraft lands.

Such a system has the following advantages:

No moving parts for FPS elements 17, 18 other than swiveling of the elements to help with smooth transition from vertical to cruise (wing borne) operation.

Minimization of complexity.

Low temperature of the air discharge from the fan 21 with modes 1.8 pressure ratio means low temperature and lightweight materials can be used for the FPS elements 17, 18, such as thermally resistant plastic composites.

Maintenance is much easier to achieve.

High speed can be achieved in cruise by switching to fan type of operation.

The gas turbine can be replaced with an electric motor for use with batteries of high energy density.

A high-efficiency system and same size turboshaft turbine can be used hence minimizing cost and weight.

Figure 7:
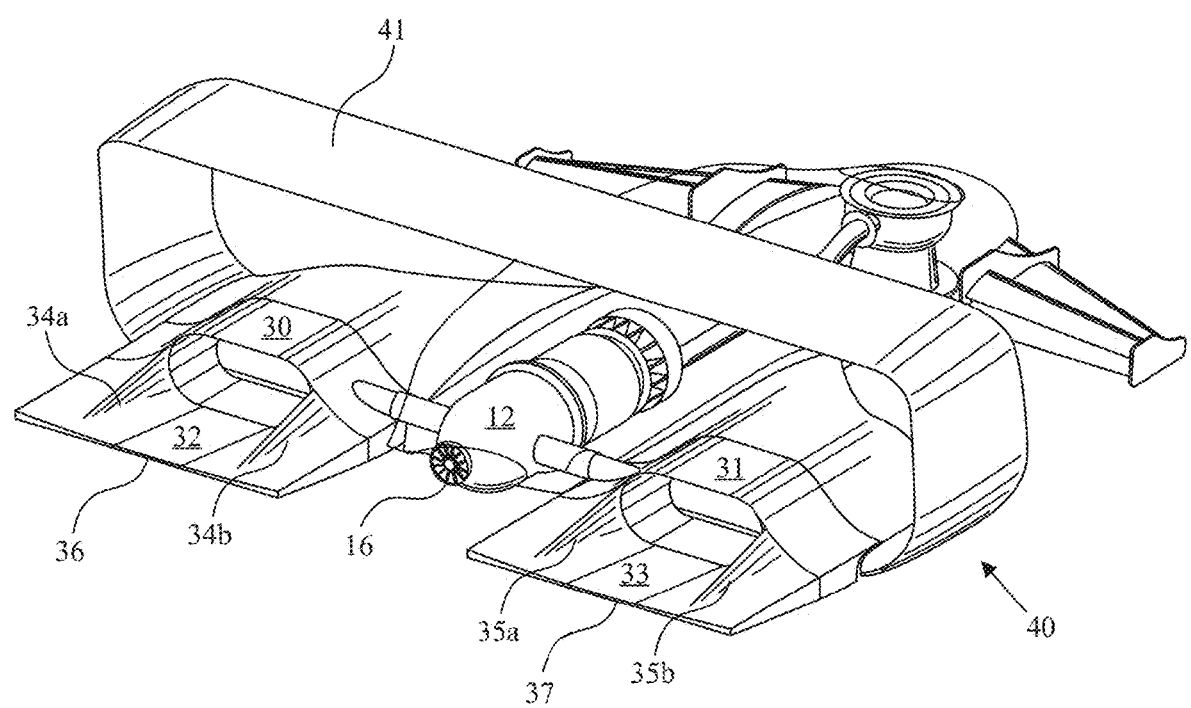
FIGS. 7-8 show an alternative embodiment of the invention, using wing-integrated FPS system elements that allows the thrust augmenting devices to be hidden during forward flight.
Figure 8:
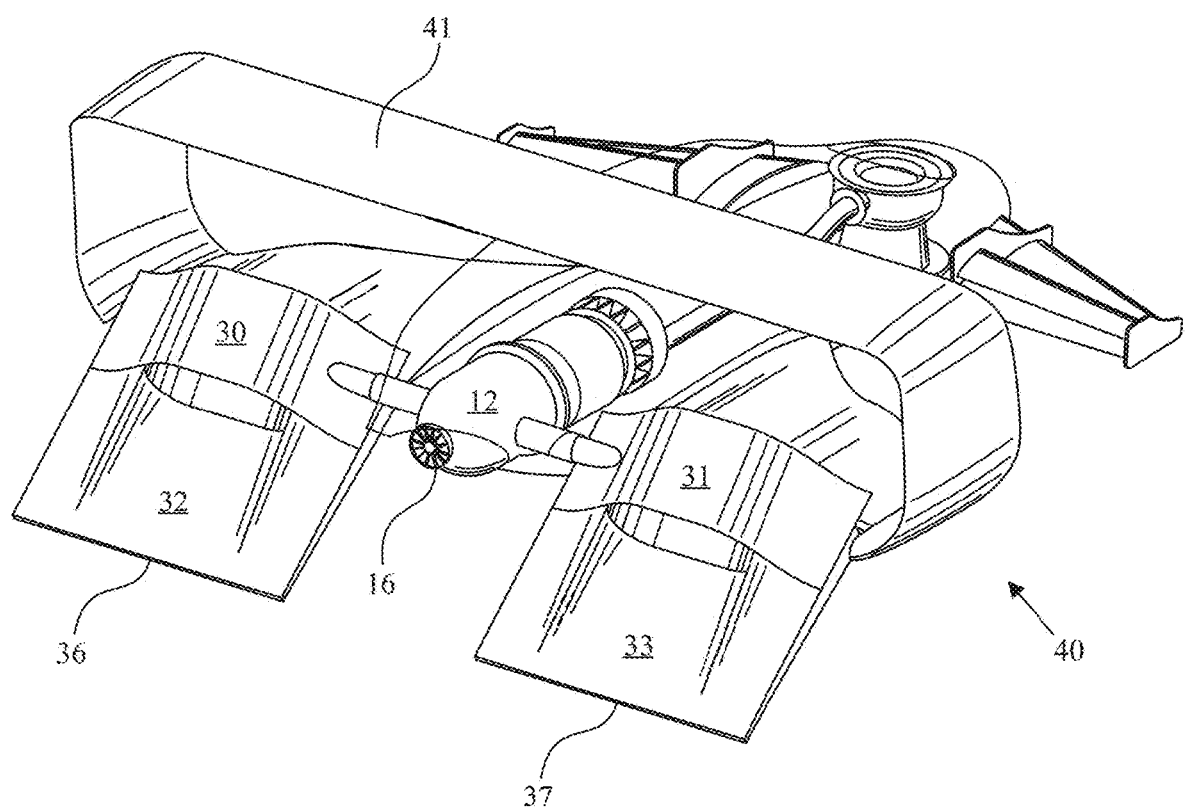

An embodiment of an aircraft 40 can be further refined by integrating the FPS system into aerodynamic control surfaces, such as airfoils, for decreased drag during high-speed flight. Such an embodiment is illustrated in FIGS. 7 and 8. In FIG. 7, propulsive elements 30, 31, similar in functionality to that of elements 17, 18, are rotated to a horizontal configuration to match the profile of the main aircraft wing 41. In this configuration, thrust is solely generated through the turbofan nozzle 16, and valves 15 are closed preventing airflow through FPS elements 30 and 31. As illustrated in FIG. 8, the FPS propulsive elements 30, 31, as well as accompanying surfaces 32-37, are rotated relative to wing 41 so that thrust is generated upwards for hover and VTOL. In this configuration, the variable nozzle vanes 16 are closed and all airflow is directed through the FPS elements 30 and 31.

FIG. 7 illustrates the geometry of this alternate embodiment. Compressed air is directed from the main plenum 12 into wall jets (not shown) in devices 30, 31. These wall jets entrain ambient air at a high bypass ratio through the slot-shaped periphery across trailing surfaces 32, 33. Surfaces 32 and 33 are partially circumscribed by sidewalls 34 *a*, 34 *b*, 35 *a*, 35 *b*. These sidewalls taper toward the airfoils trailing edges 36 and 37.

In FIG. 7, the surfaces 32, 33 play a role in generating more lift (lift augmentation) at angles shallower than 45 degrees to the horizontal (direction of flight). In this case and at the speeds of interest, the suction side of the surfaces 32, 33 that see the emerging flow from the elements 30 and 31 will experience a larger local velocity compared to the aircraft 40 velocity. In this case, and just prior to switching to the turbofan nozzle jet modus operandum, the additional lift generated by the difference in pressures on the suction and pressure sides of the surfaces 32, 33 will create more lift, as it is known in the industry and by the conditions dictated by Bernoulli. The moment of switch from using elements 30 and 31 for propulsion during VTOL, acceleration and climb of the vehicle, to guiding the compressed air through the nozzle vanes 16, is anticipated to coincide with best conditions for which the aircraft is moving at fastest, safe speeds, in good coordination with the valves 15 making the switch and attitude of the aircraft 40. The switch to using the compressed air as a motive/primary air to the thrusters (elements 30 and 31) with entrainment to a direct jet via expansion through nozzle vanes 16 at high speeds will coincide with the point where elements 30 and 31 incur a too-large RAM drag via entrained air to possibly produce enough net force to further accelerate the aircraft 40. For example, a vehicle employing this system may accelerate to speeds in the range of 150-200 mph and reach steady-state flight; for the vehicle to accelerate to 400 mph the switch is required. The vehicle may hence suffer an increase in velocity as well as in fuel consumption, due to the elements 30 and 31 no longer being employed and producing no longer a net force sufficient for acceleration. At this point, the air mass entrainment by these elements and hence thrust augmentation may fall below the acceptable levels, and a switch to use the compressed air flowrate via expansion in nozzle vanes 16 allows for further acceleration. At this point the thrusters 30, 31 would be able to be aligned with a streamlined profile reducing the drag and the RAM drag existing while in operation. The reverse is valid for slowing down and flying economically in lower speed regimes, at lower speeds but higher efficiency. Such a system results in the fastest possible commercial or military Application with VTOL capability.

The switch from thrusters (fluidic) entrainment mode to fan mode results in an optimized thermal and propulsive efficiency between the two regimes. In a regime lower than 125 mph approximately, a high thermal efficiency and better propulsive efficiency is obtained using the fluidic (thrust augmentation) via entrainment of ambient air, even if RAM drag increases with entrainment. The entrainment ratio may be for instance >10 and the velocity emerging for the mixture of compressed and entrained air may reach 105 m/s (235 mph). As entrainment diminishes and RAM increases with speed, a switch to use the entire primary air as direct jet is made beyond 125 mph. This way the thermal efficiency increases at a different rate and a high overall total efficiency, as the product between the propulsive and thermal efficiencies is obtained.

One or more embodiments of the invention include the following features:

A VTOL suitable propulsion system that can transfer thrust for an aircraft from vertical flight to wing borne flight consisting of a fan or compressor, a plenum in communication with a set of vanes that can fully open and close and having at least one other opening that can fully open and close to route said fan discharge air from fan to a secondary thrust augmenting system.

A system in which the secondary thrust augmentation system produces an augmentation between 1.25 and 3.

A system in which the fan produces a pressure ratio between 1.1 and 3.0 in said plenum.

A system in which the additional opening port can be opened and closed.

A system in which the secondary thrust system can be swiveled from a fully vertical to a fully horizontal position and in addition can be retracted or embedded in a streamlined manner to the fuselage.

A system that has a movable vane system that can turn, accelerate the air to forward cruise speeds, or fully close them to feed an augmentation system.

An aircraft using the system that can employ a gas turbine as mechanical work input to the fan.

An aircraft using the system that can employ an electric motor as driver of the fan.

An aircraft using the system that can employ a hybrid system as driver of the fan.

An aircraft employing multiples of the system in which the secondary thrust system is swiveled to minimize drag and become inactive while the fan air is directed fully through a single propelling nozzle.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims. filed * the contents of which are hereby incorporated by reference in their entirety as if fully set forth herein.

What is claimed is:

1. A propulsion system for an aircraft, comprising:
   a plenum having an intake port and an output port;
   a fan coupled to a motor configured to power the fan, the powered fan configured to compress ambient air entering the intake port;
   one or more ejectors fluidically coupled to the plenum via one or more valves, the one or more ejectors being integrated respectively with one or more airfoils having trailing edges, the one or more ejectors each comprising first and second sidewalls tapering toward the trailing edges, wherein the ejectors are rotatable through at least a 90° angle with respect to the plenum, wherein the one or more erectors comprise:
   a convex surface,
   a diffusing structure coupled to the convex surface,
   at least one conduit coupled to the convex surface and configured to introduce to the convex surface the compressed ambient air, and
   an intake structure coupled to the convex surface and configured to introduce to the diffusing structure a secondary fluid accessible to the vehicle, wherein the diffusing structure comprises a terminal end configured to provide egress from the system for the introduced compressed air and secondary fluid; and
   a nozzle disposed within the output port, the nozzle comprising a set of vanes, wherein:
     the system operates in a first configuration in which the nozzle vanes are closed and the compressed ambient air exits the plenum only through the one or more valves into the one or more ejectors, and
     the system operates in a second configuration in which the one or more valves are closed, the nozzle vanes are open and, the compressed ambient air exits the plenum only through the output port.

2. A propulsion system for an aircraft having a fuselage, the propulsion system comprising:
   a plenum having an intake port and an output port;
   a fan coupled to a motor configured to power the fan, the powered fan configured to compress ambient air entering the intake port;
   first and second ejectors fluidically coupled to the plenum via one or more valves, the first ejector being disposed on an opposite side of the plenum from the second ejector, the first and second ejectors being integrated respectively with first and second airfoils having trailing edges, the first and second ejectors comprising first and second sidewalls tapering toward the trailing edges, wherein the first and second ejectors are rotatable through at least a 90° angle with respect to the plenum, wherein the first and second ejectors each comprise:
   a convex surface,
   a diffusing structure coupled to the convex surface,
   at least one conduit coupled to the convex surface and configured to introduce to the convex surface the compressed ambient air, and
   an intake structure coupled to the convex surface and configured to introduce to the diffusing structure a secondary fluid accessible to the vehicle, wherein the diffusing structure comprises a terminal end configured to provide egress from the system for the introduced compressed air and secondary fluid; and
   a nozzle disposed within the output port, the nozzle comprising a set of vanes, wherein the propulsion system is configured to operate in:
     a first configuration in which the nozzle vanes are closed and the compressed ambient air can exit the plenum only through the one or more valves into the first and second ejectors,
     a second configuration in which the one or more valves are closed, the nozzle vanes are open, the compressed ambient air can exit the plenum only through the output port, and
     a third configuration in which the nozzle vanes are partially closed and the compressed ambient air can exit the plenum partially through the one or more valves into the first and second ejectors.

* * * * *